United States Patent [19]

Wener et al.

[11] 4,324,310
[45] Apr. 13, 1982

[54] SEISMIC APPARATUS

[75] Inventors: Kenneth R. Wener; Anthony R. Tinkle, both of Littleton, Colo.

[73] Assignee: Marathon Oil Company, Findlay, Ohio

[21] Appl. No.: 89,063

[22] Filed: Oct. 29, 1979

[51] Int. Cl.³ .............................................. G01V 1/104
[52] U.S. Cl. ..................................... 181/116; 42/1 L; 181/106; 181/113; 181/401; 175/4.55; 367/145
[58] Field of Search ................. 367/145; 181/106, 116, 181/113, 401; 175/1, 2, 4.56, 4.59, 4.5, 4.55; 166/63; 42/59, 1 L; 89/5, 135; 102/22 R

[56] References Cited

U.S. PATENT DOCUMENTS

| | | | |
|---|---|---|---|
| 2,049,236 | 7/1936 | Weatherby | 181/401 |
| 2,203,140 | 6/1940 | Green | 181/116 |
| 2,281,751 | 5/1942 | Cloud | 181/106 |
| 2,544,573 | 3/1951 | Vincent | 175/4.56 |
| 2,974,739 | 3/1961 | Dean | 175/4.56 |
| 2,993,554 | 7/1961 | Towell et al. | 181/116 |
| 3,022,729 | 2/1962 | Robinson | 175/4.56 |
| 3,052,205 | 9/1962 | Taslet et al. | 181/116 |
| 3,250,034 | 5/1966 | Simmons | 42/84 |
| 3,318,411 | 5/1967 | Doubt | 181/121 |
| 3,453,763 | 7/1969 | Barr et al. | 42/1 L |
| 3,494,060 | 2/1970 | Hendricks | 42/1 L |
| 3,721,031 | 3/1973 | Faltesman et al. | 42/1 L |
| 3,863,723 | 2/1975 | Godfrey | 175/4.57 |
| 4,026,382 | 5/1977 | Field et al. | 181/401 |
| 4,030,557 | 6/1977 | Alvis et al. | 175/4.55 |
| 4,122,621 | 10/1978 | Barr | 42/1 L |
| 4,134,223 | 1/1979 | Hillenbrandt et al. | 42/84 |
| 4,223,759 | 9/1980 | Martin | 181/116 |

FOREIGN PATENT DOCUMENTS 944472  3/1974  Canada ............................... 181/113

*Primary Examiner*—Nelson Moskowitz
*Attorney, Agent, or Firm*—Jack L. Hummel

[57] ABSTRACT

A high resolution seismic data acquisition system is made up of an electronically-fired shotgun source integrally connected to a detector-recording means displaced from the shotgun source.

5 Claims, 9 Drawing Figures

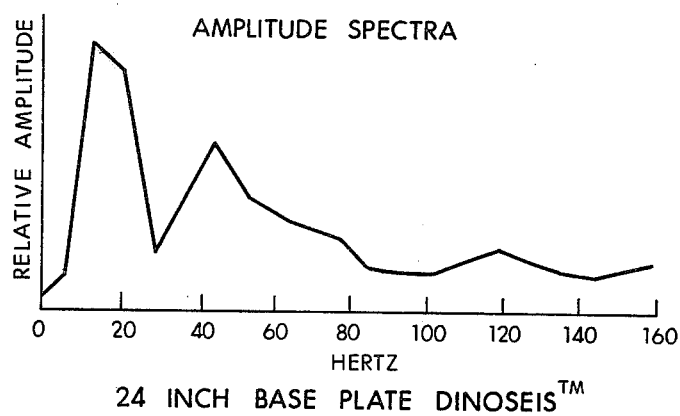
Fig. 4 — 24 INCH BASE PLATE DINOSEIS™
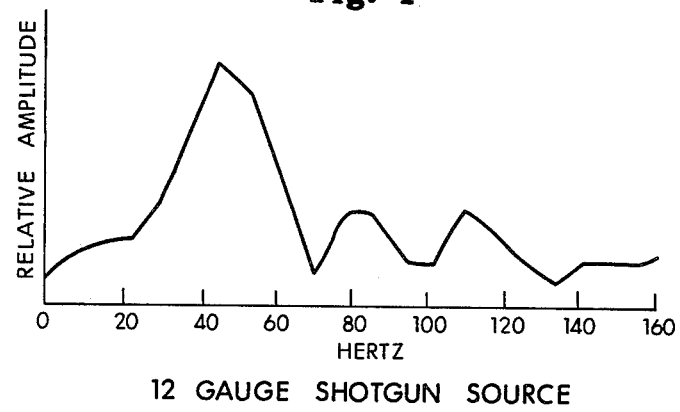
Fig. 5 — 12 GAUGE SHOTGUN SOURCE
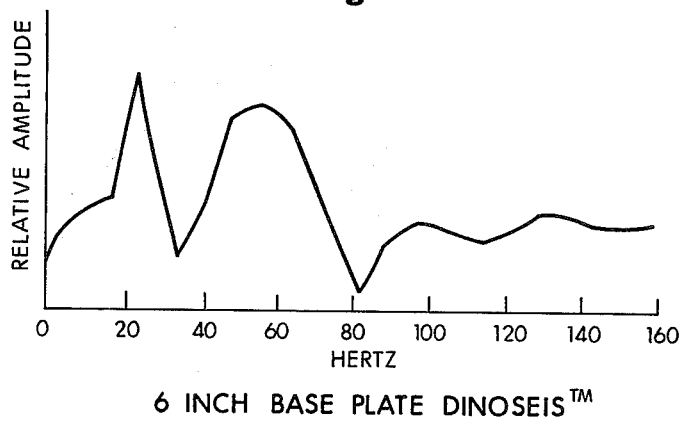
Fig. 6 — 6 INCH BASE PLATE DINOSEIS™

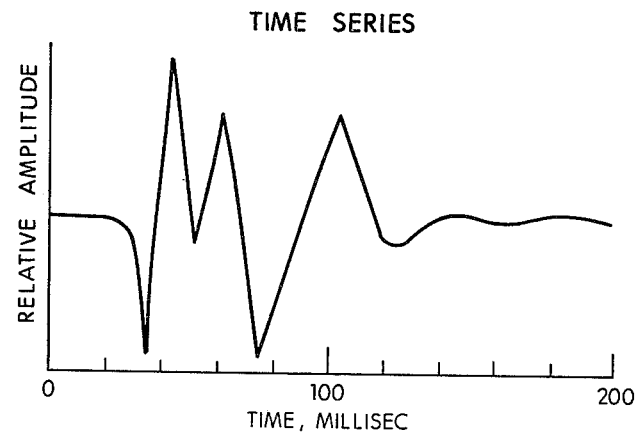
Fig. 7 24 INCH BASE PLATE DINOSEIS
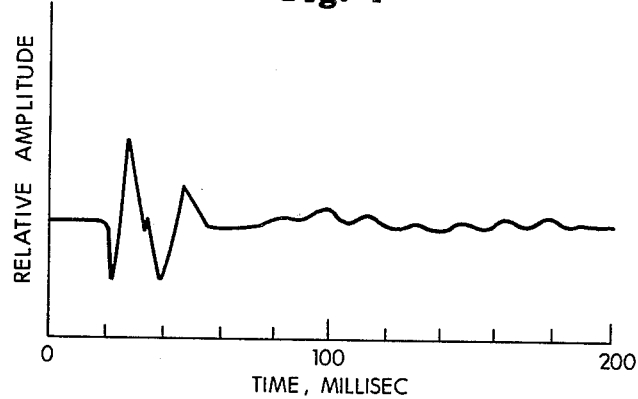
Fig. 8 12 GAUGE SHOTGUN
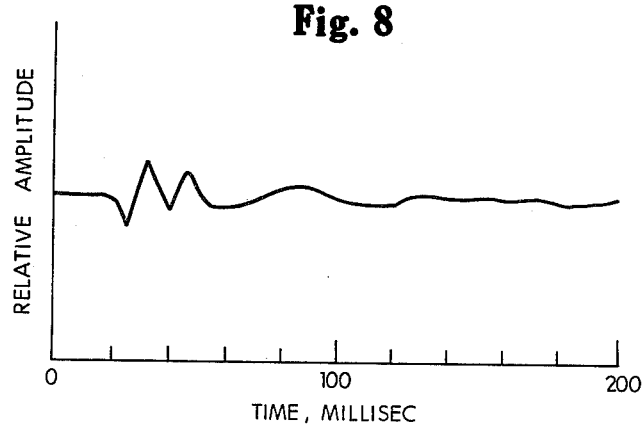
Fig. 9 6 INCH BASE PLATE DINOSEIS™

SEISMIC APPARATUS

BACKGROUND OF THE INVENTION

1. Field of the Invention

This invention relates to a portable seismic system useful in exploration for subsurface minerals.

2. Description of the Prior Art

A good portable, reliable seismic source-detector system has long been needed in experimental and/or shallow high-resolution seismic data acquisition programs. The prior art mentions the use of weight drops, hammers, air guns, gas exploders, vibrators, small explosive charges, etc. However, each of these has disadvantages in one or more of the following areas: cost, service, coupling, portability, safety, reliability, energy or frequency content.

Pertinent prior art includes:

U.S. Pat. No. 3,509,820 to Fitch et al. teaches an explosive charge assembly that can be used in an underwater seismic operation. The charges are placed in large numbers in an offshore exploration area, and then fired when desired.

U.S. Pat. No. 3,878,790 to Meyer teaches an electronic shooting circuit for seismic operations. The circuitry delivers maximum current instantaneously to one or more electric blasting caps that are being detonated.

U.S. Pat. No. 2,544,573 to Vincent teaches an improved apparatus for well drilling containing one or more barrels through which projectiles are fired to fracture the formation. The sealed apparatus is lowered through the drill pipe to the bottom of the well and fired. The apparatus is withdrawn by way of an attached wire line.

Applicants have invented a portable, inexpensive system suitable for use in a wide variety of experimental, field testing, shallow check-shot survey and shallow, high resolution seismic data acquisition applications.

The explosive seismic source provided by this apparatus provides a broad band, highly directional explosive shock at an energy level comparable to a 24-inch base place Dinoseis truck. When fired at the bottom of a shallow hole (e.g. about 10 feet deep) most of the energy is directed downward and less ground roll, i.e. horizontal wave, is generated than from other comparable sources.

SUMMARY OF THE INVENTION

The seismic system includes a gun assembly, made up of a breech, a barrel and a seal section. The barrel holds one or more explosive energy sources, e.g., 12 gauge shotgun shells. The seal section has a seal which excludes water, etc. from the barrel. Weights can be used to drive the gun assembly on or into mud, marsh or the bottom of a body of water. The seal is frangible and is pierced when the seismic source is detonated. The shock wave emitted by the explosive is recorded when initiated and response to the shockwave is recorded at a predetermined distance from the source. The firing time of the explosive (the time the shock wave is initiated) is transmitted to the recording means.

BRIEF DESCRIPTION OF THE DRAWINGS

FIGS. 4, 5 and 6 depict and compare amplitude spectra of waveforms generated and recorded through the source of this invention and a commercial source.

FIGS. 7, 8 and 9 depict the time series waveforms of FIGS. 3, 4 and 5.

DESCRIPTION OF THE PREFERRED EMBODIMENTS

Figure 1:
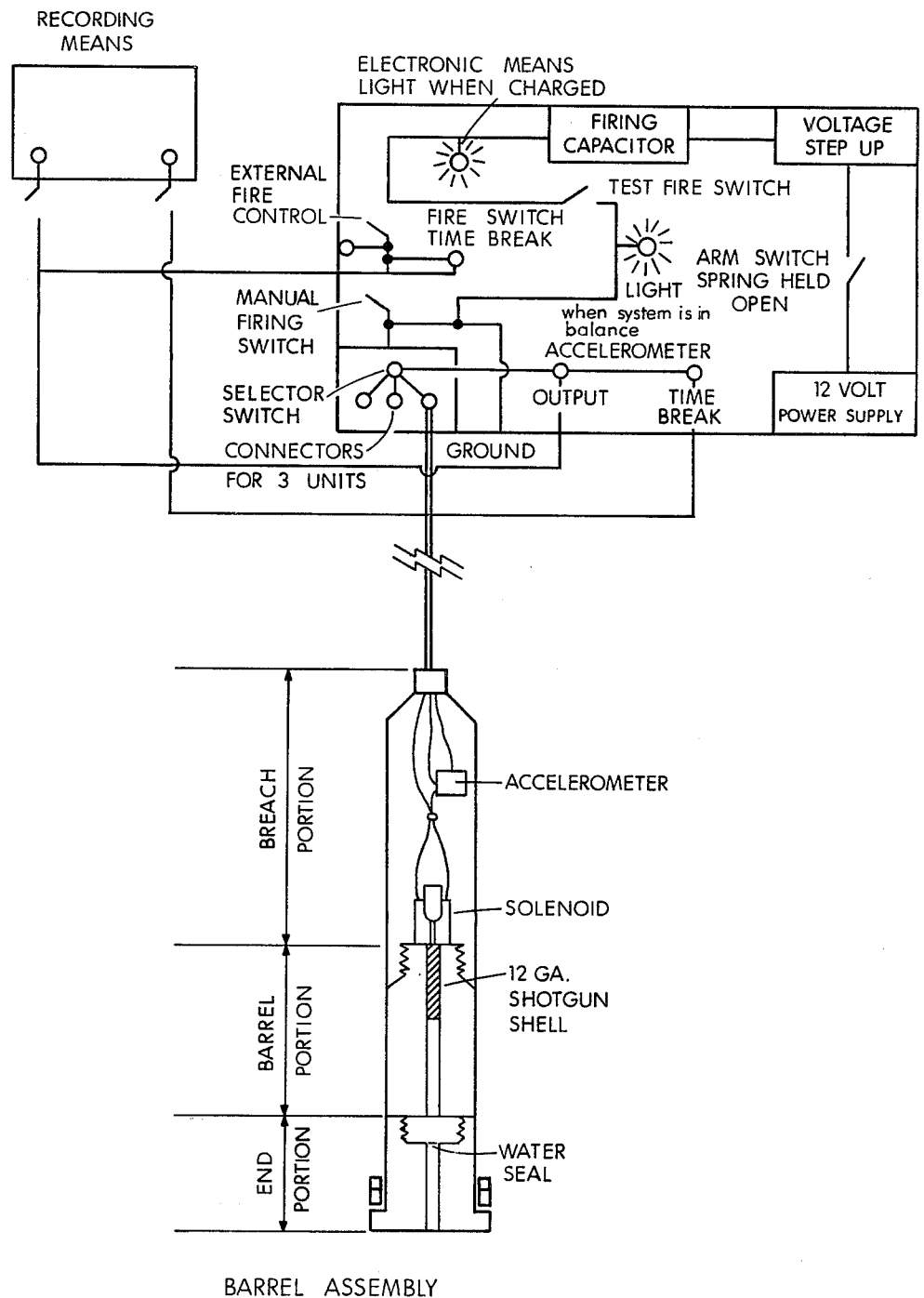
FIG. 1 is a side view of the gun assembly in connection with the detonator and the recording means.

The gun assembly in FIG. 1 comprises a seal, a barrel and a breech. The seal and the breech assembly are screwed into the barrel assembly. A 12-gauge shotgun shell is mounted in the top portion of the barrel and the breech assembly sits on top of the barrel. A solenoid mounted above the 12-gauge shotgun shell detonates the shotgun shell in response to an electric signal. An accelerometer can be, and preferably is, mounted in the top of the breech assembly and electrically connected to a recorder to signal when the seismic explosive charge is detonated. The seal at the bottom of the barrel excludes water, etc.

FIG. 1 provides a typical electronic configuration. A 12-volt power supply charges the firing capacitor through the voltage step up means. Once the firing capacitor is at its charged peak, a light comes on. Thereafter, the circuitry can be tested by the "test fire switch" to make sure everything is operative. If it is operative, the light will come on. Thereafter, the test fire switch is closed and the system is armed. The manual firing switch is then closed triggering the solenoid activation and firing the shotgun shell. The accelerometer within the barrel signals electronically when the shock response from the barrel assembly is felt. The output or signal from the accelerometer can be transmitted to a recorder. Firing can be effected simultaneously or in sequence among a plurality of assemblies.

The recorder can also be used to control the electronic firing means. That is, the recorder can be connected to the firing switch time break and connected to the accelerometer "output" so that all control is exercised by the recording means. The recording means can be on land, air, etc.

Figures 2, 3:
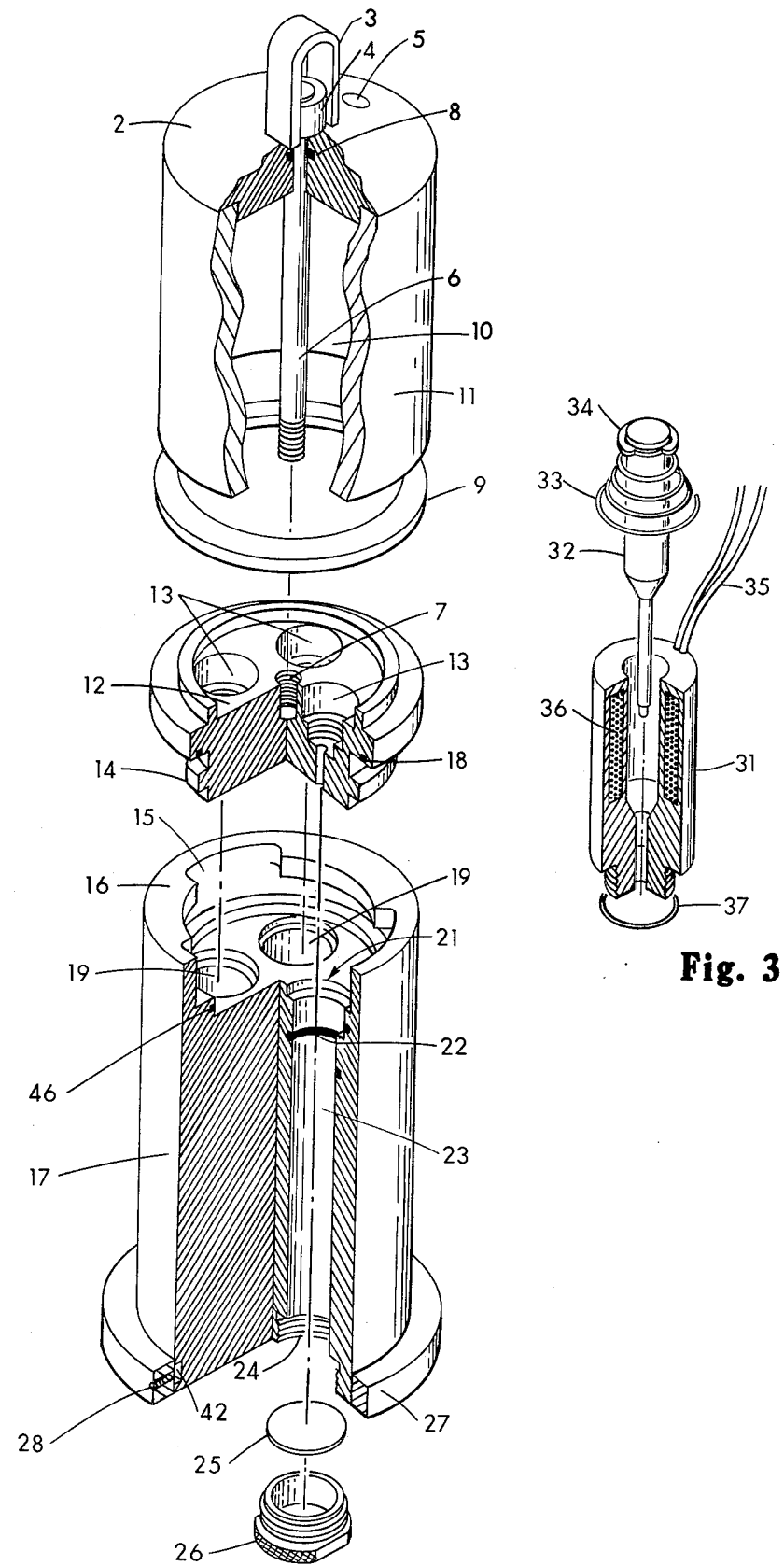
FIG. 2 is a preferred embodiment of the gun assembly showing one of three barrels. The preferred locking mechanism, i.e., the twist lock for the breech, is shown.
FIG. 3 depicts the firing pin assembly.

FIG. 2 depicts the gun assembly. The gun is made up of a breech, a barrel assembly, and a seal.

The breech is made up of a cap 2 having a bail 3 and a nut 4 welded thereto. Hole 5 is provided for wires from a remote detonator switch, etc. Any seal can be used to prevent the entry of water. The breech assembly is held together with bolt 6 which screws into nut 4 and threads 7 to hold the assembly together. Seals 8 and 9 combine to prevent the entry of fluids. Timers, accelerometers, etc., (not shown) can be placed within the space 10 formed by cap 2, cylinder 11 and base 12. Base 12 is shown with threaded recesses 13, perforated at the bottom and adapted to receive the firing pin assembly of FIG. 3, and ears 14 which provide a conventional twist lock in combination with recesses 15 and lips 16 on the upper end of barrel 17. "O" ring 18 provides a watertight seal between the breech and the barrel when the unit is assembled.

Barrel assembly 17 is shown with three barrels 19, one of which is cut away to show the interrelationships within the unit. Each barrel 19 has a recess 21 adapted to receive the rim of an appropriate gauge shotgun shell. "O" ring 22 insures that fluid will not enter the breech after detonation. Barrel 23 terminates in a threaded, recessed portion into which seal 25 seats and is locked in place by seal retainer 26. The device is shown with a retainer ring 27 having screws 28 affixing ring 27 to the base of the gun assembly 17. Weights can be stacked on ring 27 to insure proper seating of the unit on the sea floor, etc.

FIG. 3 depicts the firing pin assembly. It is made up of a pin barrel 31, a pin 32, spring 33, and retaining clip 34. The unit is shown with wires 35 leading to coil 36. The bottom of pin assembly 31 is threaded and screws into threaded recesses 13 when seal 37 is in place.

The firing pin is actuated by an electrical impulse arriving through wires 35 causing coil 36 to pull pin 32 downward against the thrust of spring 33. The pin strikes the base of the shotgun shell and the detonation ensues.

For some uses, the unit may not require all of the seals shown. However, if the unit is to be used where there are substantial amounts of water, all seals should be in place. Often, standard shotgun shells are used. However, the amount of powder loaded within the shell can be of a predetermined quantity, depending upon the seismic shock wave desired. While the standard shotgun shell will contain shot, this is not necessary for operation of the unit. While an electric firing pin assembly is depicted, a percussion type will work equally well.

Preferably an accelerometer, not shown, is mounted within the barrel assembly and connects it to a remote recording device so that the exact moment of detonation can be used in the evaluation of the seismic signals received.

Seal 25 is frangible and may be no more than a plastic blank which ruptures at a particular pressure within the gun barrel.

For surface shooting, 40 or 50 pounds of weights insure that the barrel assembly rests firmly on the surface. If the barrel is to be used in mud, much greater weights may be required to insure that the assembly penetrates the mud to a desired degree.

While a three-barrel assembly is shown, any number can be used and a timer-activated electric detonator can be placed within cap assembly 11.

FIGS. 4, 5 and 6 compare the amplitude spectra of a 24-inch base plate Dinoseis source unit, 6-inch base plate Dinoseis source unit and a single 12-gauge, three inch magnum shotgun shell, respectively. The signal waveforms of FIGS. 6, 7 and 8 are similar in the depicted shooting configuration but the shotgun source has a sharper rise time on the first peak of the time series, yielding a broader band first lobe on the amplitude plot. These signals are recorded on an analog oscilloscope from a buried Walker-Hall-Sears Z-1c, 10 Hertz velocity geophone located at the bottom of an earth filled hole 40 feet under the shot location.

The invention described and claimed herein is intended to include modifications made thereto by those skilled in the art within the scope of the invention.

What is claimed is:

1. A seismic apparatus for high resolution seismic data acquisition, said seismic apparatus being inserted underground, said seismic apparatus comprising,
   a cylindrically shaped breech having a formed interior space,
   a cylindrically shaped barrel assembly having at least one formed barrel hole extending the longitudinal length of said barrel assembly, said barrel assembly being capable of releasably engaging said breech in fluid tight coupling,
   a cylindrically shaped end portion releasably engaging said barrel assembly in fluid tight coupling for extending the longitudinal length of said at least one formed barrel hole,
   an explosive seismic source selectively insertable in said at least one barrel hole between said barrel assembly and said breech,
   a firing pin assembly located in said formed interior space of said breech operatively abutting said explosive seismic source,
   a first seal mounted between said end portion and said barrel assembly across said at least one formed barrel hole for providing a fluid seal to prevent fluids from entering said at least one formed barrel hole when said seismic apparatus is inserted into said hole, said seal being capable of rupturing when said explosive seismic source is fired, and
   a second seal mounted between said seismic source and said firing means for preventing entry of said fluids into said formed interior space of said breech after said first seal is ruptured.

2. The seismic apparatus of claim 1 further comprising:
   means mounted in said formed interior space for sensing the firing of said seismic source.

3. The seismic apparatus of claim 1 wherein said seismic source is a shotgun shell inserted into said at least one formed barrel hole and said second seal is an O-ring disposed around the outersurface of said shell and the interior surface of said at least one formed barrel hole.

4. The seismic apparatus of claim 1 further comprising means remotely located from said firing pin assembly and operatively interconnected therewith for selectively activating the firing of said firing pin assembly.

5. The seismic apparatus of claim 4 wherein said firing pin assembly comprises:
   a coil of wire being capable of selectively energizing by said remote activating means,
   a pin disposed in a formed hole in the center of said coil, and
   means for normally pulling and holding said pin substantially out of said hole, said coil when energized being capable of rapidly pulling said pin downwardly in said formed hole.

* * * * *